Jan. 5, 1960 B. B. RIEDEL 2,919,582
AUTOMOBILE WHEEL BALANCING APPARATUS
Filed April 3, 1956 2 Sheets-Sheet 1

Bernard B. Riedel
INVENTOR
BY C.A. Snow & Co.
ATTORNEYS.

Jan. 5, 1960 B. B. RIEDEL 2,919,582
AUTOMOBILE WHEEL BALANCING APPARATUS
Filed April 3, 1956 2 Sheets-Sheet 2

Bernard B. Riedel
INVENTOR

BY C. A. Snowles.
ATTORNEYS.

United States Patent Office 2,919,582
Patented Jan. 5, 1960

2,919,582

AUTOMOBILE WHEEL BALANCING APPARATUS

Bernard B. Riedel, State College, Miss.

Application April 3, 1956, Serial No. 575,887

1 Claim. (Cl. 73—484)

This invention relates to an apparatus designed for balancing automobile wheels prior to mounting the wheels on their axles, and aims to provide means for supporting a motor vehicle wheel in a suspended horizontal position so that a variation of weight at any point on the circumference of the wheel will cause the wheel to tilt, indicating the heavy and light points around the wheel circumference.

An important object of the invention is the provision of an exceptionally sensitive bearing for the apparatus to insure an accurate measurement of any irregularity in the balance of the wheel so that conventional wheel balancing weights may be attached to the rim of the wheel to accurately balance the wheel.

Another object of the invention is to provide a device of this character which may be adjusted for use in balancing wheels of various sizes and weights.

Still another object of the invention is to provide a balancing apparatus wherein a spirit level may be used in determining the exact place where a balancing weight may be secured in balancing the wheel under observation.

Other and further objects and advantages of the invention will be hereinafter described and the novel features thereof defined in the appended claim.

Referring to the drawings.

Figure 1:
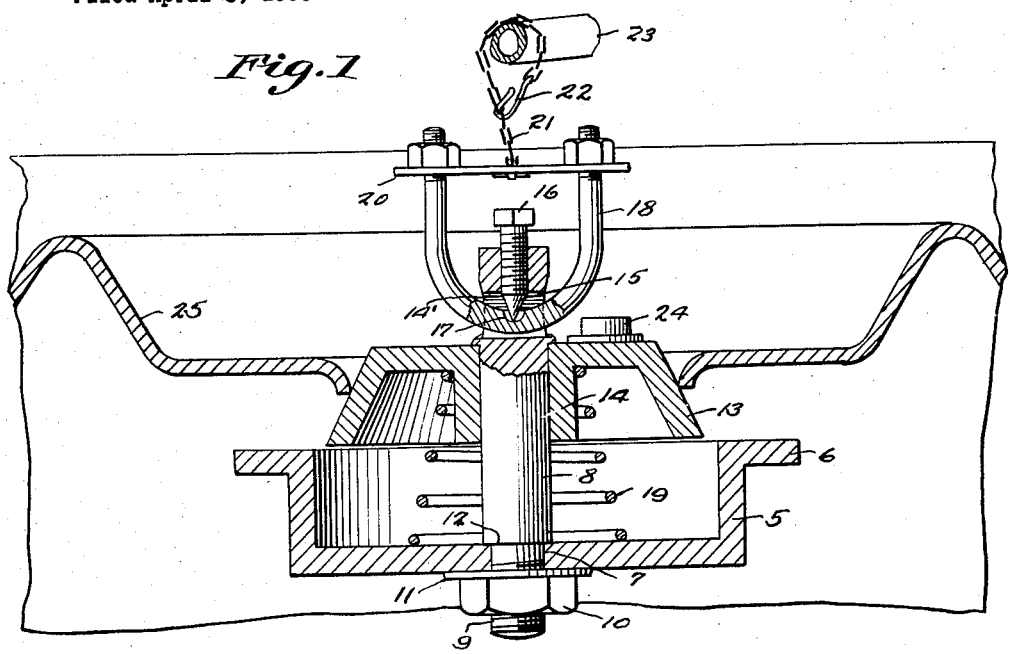
Fig. 1 is a sectional view through a balancing apparatus constructed in accordance with the invention, illustrating a portion of a wheel as positioned thereon.
Figure 2:
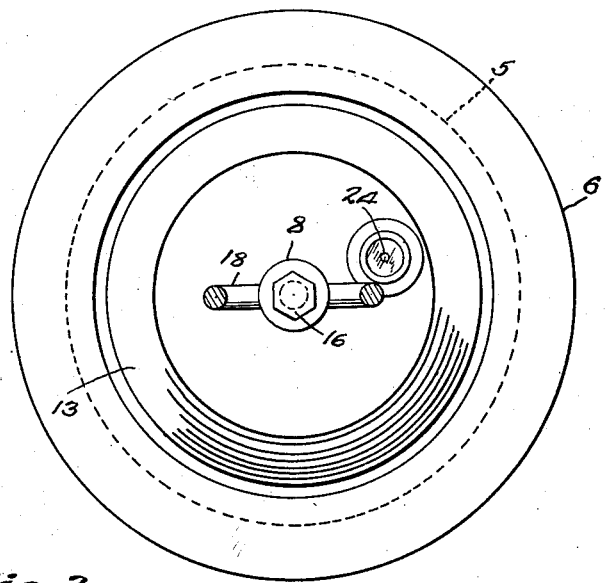
Fig. 2 is a plan view of the device the U bolt providing a supporting element of the device being shown in section.
Figure 3:
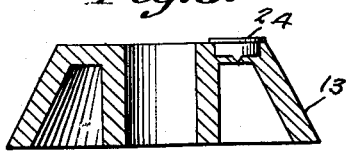
Fig. 3 is a vertical sectional view through the cone forming a part of the apparatus.

Referring to the drawings in detail the body portion of the apparatus is indicated generally by the reference character 5 and comprises a circular hollow member with an annular outwardly extended marginal flange 6.

The body portion 5 is formed with an opening 7 disposed axially thereof, through which the post 8 extends, the post 8 having its lower end threaded at 9 to receive the nut 10 which nut forces the washer 11 against the bottom of the body portion 5 to move the body portion into contact with the shoulder 12 formed at the lower end of the post 8, as better shown by Fig. 1 of the drawings.

The apparatus also embodies a cone 13 which also has an opening disposed axially thereof, portions of the cone extending downwardly at 14 providing a bearing for the post 8 which extends through the central opening of the cone 13.

This post 8 is formed with an enlarged transversely disposed opening 14' arranged near the upper end thereof, which opening provides a housing for the pointed end 15 of the bearing screw 16 that is shown as having its pointed end 15 resting in the recess 17 formed in the curved portion of the U bolt 18.

The reference character 19 indicates a coiled spring which is mounted between the cone and bottom of the body 5, the coiled spring 19 having its convolutions successively decrease in diameter towards the upper end of the coiled spring, as better shown by Fig. 1 of the drawings.

Thus it will be seen that due to this construction, the coiled spring 19 normally urges the cone 13 upwardly away from the base of the body 5.

Mounted on the U bolt 18 is a plate 20 which connects the arms of the U bolt, the plate 20 having an opening in which one end of a chain 21 is secured, the chain carrying a hook 22 so that the hook may be hooked into a link of the chain after it has been looped around a supporting rod such as indicated by the numeral 23 which rod 23 is elevated above the floor surface so that a wheel positioned on the apparatus will be suspended in spaced relation with the floor surface to insure proper reading of the spirit level forming a part of the apparatus, and which is indicated by the reference character 24.

In Fig. 1 of the drawings, a wheel indicated by the reference character 25 is shown as positioned over the cone 13 for observation in determining the balance of the wheel. The weight of the wheel 25 will cause the tilting of the body portion and wheel 25 mounted thereon, at the bearing 15 which tilting will be indicated on the spirit level 24 to determine the heavy and light sides of the wheel caused by the wheel being out of balance. The operator of the apparatus can now determine the exact location for a weight to properly balance the wheel.

Figure 4:
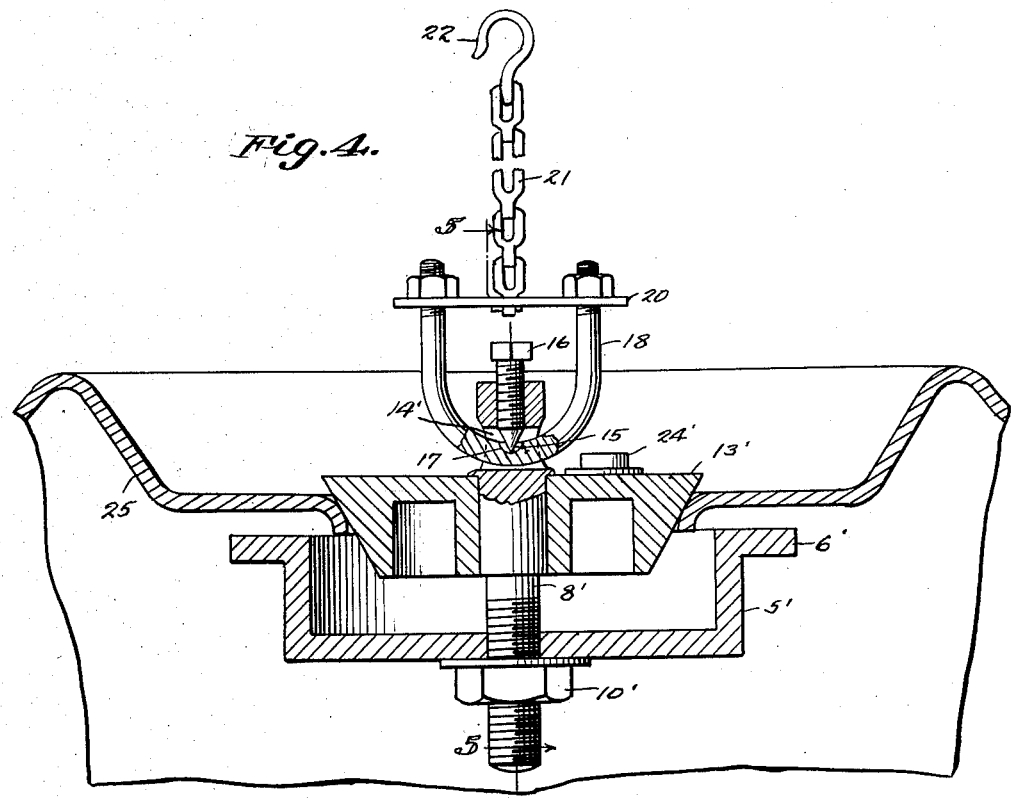
Fig. 4 is a vertical sectional view through a modified form of the invention.
Figure 5:
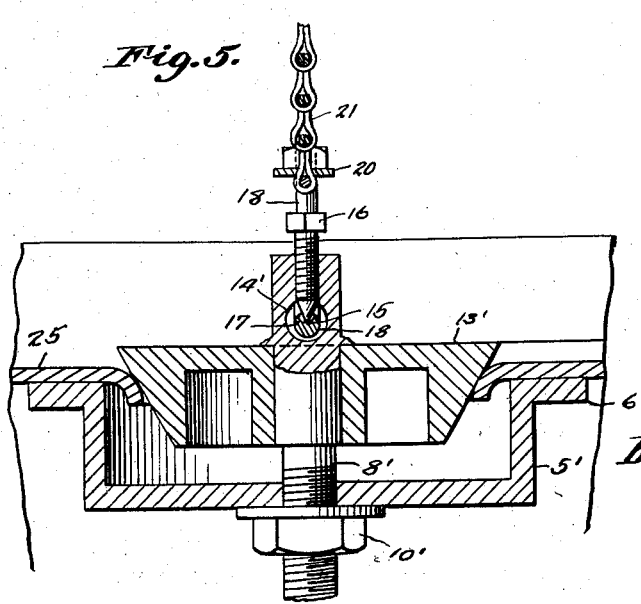
Fig. 5 is a sectional view taken on a line 5—5 of Fig. 4 showing the device in wheel clamping position.

In the form of the invention as shown by Figures 4 and 5 of the drawings, the cone indicated by the reference character 13' is shown as inverted, with the small end of the cone directed downwardly. In this form of the invention the wheel being tested for balance may be positioned on the base 5' and the cone 13' forced downwardly into the axle opening of the wheel, causing the wheel to be securely held in place so that a reading may be had by observing the spirit level 24'. In this form of the invention the base together with the wheel thereon will tilt indicating an over balanced point on the wheel so that a weight may be added thereto to properly balance the wheel.

With the elements of the wheel balancer assembled as described and better shown by Fig. 1 of the drawing, the cone of the desired size to fit the wheel hub hole of the wheel under test is selected.

The chain link 21 is adjusted by placing the hook 22 into a chain link, so that the wheel suspended in a horizontal position is approximately six inches to ten inches from the ground floor.

The bearing screw 16 is screwed into the top end of the upper end of post 8 until the pointed end 15 thereof suspends the weight of the instrument or apparatus in the fulcrum recess 17, the U bolt being out of contact with the edges or sides of the opening 14', which is of a diameter substantially larger than the cross sectional diameter of the U bolt.

The wheel and tire are cleaned to remove any foreign matter which may tend to unbalance the wheel, and the chain 21 and U bolt assembly are inserted through the wheel hub hole from the inside of the removed wheel. The hook 22 is secured to a car jack handle providing the car jack handle is longer than the radial distance of the automobile wheel when the jack is in use. In lieu of the jack handle, a saw horse or the upper edge of the car bumper at the corner of the car where the wheel was removed, or a rafter of a building may be used in this capacity.

The car wheel is then raised to make certain that the weight of the wheel is not on the pivot 17, until the wheel and tire are in a near horizontal position, thereby preventing damage to the pivot.

The wheel with its tire is then slowly lowered until the cone 13 centers the instrument in the wheel hub hole.

The wheel is now further lowered until the weight of the wheel depresses the cone 13 and compresses the spring 19, with the car wheel resting on the rim 6 of the body 5.

The circular spirit level 24 is now placed on the horizontal top of the cone 13. The car wheel weights are then laid on the rim on the light side of the wheel until the air bubble or spirit level is perfectly centered in the circle of the glass surface of the spirit level 24.

The total of the weights in ounces required to bring the spirit level in position to indicate an exact balance, may now be determined.

The number of ounces required to balance the wheel are determined and weights are selected so that one-half of the quantity required to balance the wheel may be hammered into the rim of each side of the wheel.

In using the form of the invention as illustrated by Figures 4 and 5 of the drawings, the cone 13' is moved into the axle opening of the wheel and is drawn into contact with the wall of the opening so that the wheel is forced downwardly onto the annular flange of the body portion 5'. It is obvious that on the sensitive bearing which is identical with the bearing as shown in Figure 1 of the drawings, the wheel will tilt to the heavy side and indicate the location of the weights to be added in balancing the wheel.

Figure 6:
Fig. 6 is a sectional view through a modified form of cone, forming a part of the apparatus.

The cone 30 as shown by Fig. 6 is of a solid construction with the exception of a central opening 31 for the reception of the post 8, when this form of cone is used. The cone 30 is supplied with a spirit level 31 for indicating balance.

Having thus described the invention what is claimed is:

A motor vehicle wheel testing device comprising a circular body, a vertical post rising from the center of said body extending a substantial distance above said body, a cone having a central apertured bushing slidably mounted on said post, a spirit level mounted on the upper surface of said cone, a coiled spring disposed between said body and cone surrounding said bushing normally biasing said cone away from said body, a flange on said post limiting upward movement of said cone, said cone providing a support for a wheel fitted over said cone, said post having an opening extending transversely therethrough adjacent to the upper end thereof above said flange, and having a threaded opening formed in the end of said post in a line with the longitudinal axis of said post, a bearing screw fitted in said threaded opening, said bearing screw having a pointed bearing end extending into said transversely extended opening, a U bolt having its intermediate curved portion disposed within the transverse opening of said post with its ends disposed upwardly, said U bolt having a recess in its curved portion in which the pointed bearing end of said screw engages, providing a suspension mechanism pivotally supporting said wheel under test.

References Cited in the file of this patent

UNITED STATES PATENTS

| | | |
|---|---|---|
| 2,462,266 | Howard | Feb. 22, 1949 |
| 2,506,002 | Tinkham | May 2, 1950 |
| 2,698,537 | Taylor et al | Jan. 4, 1955 |
| 2,720,110 | Lucht | Oct. 11, 1955 |